United States Patent
Yu et al.

(10) Patent No.: US 12,209,168 B2
(45) Date of Patent: Jan. 28, 2025

(54) POLYURETHANE FOAM PREMIXES CONTAINING HALOGENATED OLEFIN BLOWING AGENTS AND FOAMS MADE FROM SAME

(71) Applicant: HONEYWELL INTERNATIONAL INC., Morris Plains, NJ (US)

(72) Inventors: Bin Yu, Tonawanda, NY (US); David J. Williams, East Amherst, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/068,279

(22) Filed: Oct. 12, 2020

(65) Prior Publication Data
US 2021/0032430 A1    Feb. 4, 2021

Related U.S. Application Data

(60) Continuation of application No. 15/902,726, filed on Feb. 22, 2018, now abandoned, which is a division of
(Continued)

(51) Int. Cl.
| | | |
|---|---|---|
| C08J 9/14 | (2006.01) | |
| C08G 18/16 | (2006.01) | |
| C08G 18/18 | (2006.01) | |
| C08G 18/22 | (2006.01) | |
| C08G 18/40 | (2006.01) | |
| C08G 18/42 | (2006.01) | |
| C08G 18/48 | (2006.01) | |
| C08G 18/50 | (2006.01) | |
| C08G 18/76 | (2006.01) | |
| C08G 101/00 | (2006.01) | |
| C08J 9/02 | (2006.01) | |

(52) U.S. Cl.
CPC ............ *C08J 9/146* (2013.01); *C08G 18/163* (2013.01); *C08G 18/1808* (2013.01); *C08G 18/1816* (2013.01); *C08G 18/222* (2013.01); *C08G 18/227* (2013.01); *C08G 18/4018* (2013.01); *C08G 18/4208* (2013.01); *C08G 18/482* (2013.01); *C08G 18/5021* (2013.01); *C08G 18/7664* (2013.01); *C08J 9/02* (2013.01); *C08J 9/144* (2013.01); *C08G 2101/00* (2013.01); *C08J 2201/022* (2013.01); *C08J 2203/162* (2013.01); *C08J 2375/04* (2013.01)

(58) Field of Classification Search
CPC .................................. B01J 23/18; B01J 27/24
See application file for complete search history.

(56) References Cited

U.S. PATENT DOCUMENTS

| | | | | |
|---|---|---|---|---|
| 3,431,223 A | * | 3/1969 | Reymore, Jr. ..... | C08G 18/5075 521/157 |
| 2009/0099274 A1 | * | 4/2009 | Van Der Puy ..... | C08G 18/1808 521/110 |

(Continued)

*Primary Examiner* — Peter F Godenschwager
(74) *Attorney, Agent, or Firm* — FisherBroyles, LLP; Joseph F. Posillico

(57) ABSTRACT

Disclosed are polyol premix compositions, and foams formed therefrom, which comprise a combination of a hydrohaloolefin blowing agent, a polyol, a silicone surfactant, and a catalyst system that includes a bismuth-based metal catalyst. Such catalysts may be used alone or in combination with an amine catalyst and/or other non-amine catalysts.

20 Claims, 2 Drawing Sheets

Related U.S. Application Data application No. 14/187,633, filed on Feb. 24, 2014, now abandoned, and a continuation-in-part of application No. 13/491,534, filed on Jun. 7, 2012, now abandoned, and a continuation-in-part of application No. 13/400,559, filed on Feb. 20, 2012, now Pat. No. 9,051,442, and a continuation-in-part of application No. 13/400,563, filed on Feb. 20, 2012, now Pat. No. 9,556,303.

(60) Provisional application No. 61/769,324, filed on Feb. 26, 2013, provisional application No. 61/494,868, filed on Jun. 8, 2011, provisional application No. 61/445,027, filed on Feb. 21, 2011, provisional application No. 61/445,022, filed on Feb. 21, 2011.

(56) References Cited

U.S. PATENT DOCUMENTS

| | | | | |
|---|---|---|---|---|
| 2009/0326148 A1* | 12/2009 | Schmalkuche | .... | C08G 18/4841 524/789 |
| 2012/0202903 A1* | 8/2012 | Andrew | ................ | C08G 18/12 521/109.1 |

* cited by examiner

POLYURETHANE FOAM PREMIXES CONTAINING HALOGENATED OLEFIN BLOWING AGENTS AND FOAMS MADE FROM SAME

CROSS REFERENCE TO RELATED APPLICATIONS

The present application is a continuation of U.S. application Ser. No. 15/902,726, filed Feb. 22, 2018 (now pending), which application is a division of U.S. application Ser. No. 14/187,633, filed Feb. 24, 2014 (now pending) which application claims priority to U.S. Provisional Application Ser. No. 61/769,324, filed Feb. 26, 2013, the contents of which are incorporated herein by reference in its entirety.

The present application is also a continuation-in-part of U.S. application Ser. No. 13/400,559, filed Feb. 20, 2012 (now U.S. Pat. No. 9,051,442, issued Jun. 9, 2015), which claims the priority benefit of each of U.S. Provisional Application No. 61/494,868, filed Jun. 8, 2011, U.S. Provisional Application No. 61/445,027, filed Feb. 21, 2011, and U.S. Provisional Application No. 61/445,022, filed Feb. 21, 2011, each of which is incorporated herein by reference in its entirety as is fully set forth below.

The present application is also a continuation-in-part of U.S. application Ser. No. 13/491,534, filed Jun. 7, 2012 (now abandoned), which claims the priority benefit of U.S. Provisional Application No. 61/494,868, filed Jun. 8, 2011, each of which is incorporated herein by reference in its entirety as is fully set forth below.

The present application is also a continuation-in-part of U.S. application Ser. No. 13/400,563, filed Feb. 20, 2012 (now U.S. Pat. No. 9,556,303, issued Jan. 31, 2017), which claims the priority benefit of each of U.S. Provisional Application No. 61/445,027, filed Feb. 21, 2011 and U.S. Application 61/445,022, filed Feb. 21, 2011, each of which is incorporated herein by reference in its entirety as is fully set forth below.

FIELD OF THE INVENTION

The present invention pertains to polyurethane and polyisocyanurate foams, to foamable compositions, blowing agents and catalyst systems and methods for the preparation thereof.

BACKGROUND OF THE INVENTION

Certain rigid to semi-rigid polyurethane or polyisocyanurate foams have utility in a wide variety of insulation applications including roofing systems, building panels, building envelope insulation, spray applied foams, one and two component froth foams, insulation for refrigerators and freezers, and so called integral skin for applications such as steering wheels and other automotive or aerospace cabin parts, shoe soles, and amusement park restraints. Important to the large-scale commercial acceptance of rigid polyurethane foams is their ability to provide a good balance of properties. For example, many rigid polyurethane and polyisocyanurate foams are known to provide outstanding thermal insulation, excellent fire resistance properties, and superior structural properties at reasonably low densities. Integral skin foams are generally known to produce a tough durable outer skin and a cellular, cushioning core.

It is known in the art to produce rigid or semi-rigid polyurethane and polyisocyanurate foams by reacting a polyisocyanate with one or more polyols in the presence of one or more blowing agents, one or more catalysts, one or more surfactants and optionally other ingredients. Blowing agents that have heretofore been used include certain compounds within the general category of compounds including hydrocarbons, fluorocarbons, chlorocarbons, chlorofluorocarbons, hydrochlorofluorocarbons, halogenated hydrocarbons, ethers, esters, aldehydes, alcohols, ketones, and organic acid or gas, most often $CO_2$, generating materials. Heat is generated when the polyisocyanate reacts with the polyol. This heat volatilizes the blowing agent contained in the liquid mixture, thereby forming bubbles therein. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the foam's cells. If a surfactant is not used in the foaming composition, in many cases the bubbles simply pass through the liquid mixture without forming a foam or forming a foam with large, irregular cells rendering it not useful.

The foam industry has historically used liquid blowing agents that include certain fluorocarbons because of their ease of use and ability to produce foams with superior mechanical and thermal insulation properties. These certain fluorocarbons not only act as blowing agents by virtue of their volatility, but also are encapsulated or entrained in the closed cell structure of the rigid foam and are the major contributor to the low thermal conductivity properties of the rigid urethane foams. These fluorocarbon-based blowing agents also produce a foam having a favorable k-factor. The k-factor is the rate of transfer of heat energy by conduction through one square foot of one-inch thick homogenous material in one hour where there is a difference of one degree Fahrenheit perpendicularly across the two surfaces of the material. Since the utility of closed-cell polyurethane-type foams is based, in part, on their thermal insulation properties, it would be advantageous to identify materials that produce lower k-factor foams.

Preferred blowing agents also have low global warming potential. Among these are certain hydrohaloolefins including certain hydrofluoroolefins of which trans-1,3,3,3-tetrafluoropropene (1234ze(E)) and 1,1,1,4,4,4hexafluorobut-2-ene (1336mzzm(Z)) are of particular interest and hydrochlorofluoroolefins of which 1-chloro-3,3,3-trifluoropropene (1233zd) (including both cis and trans isomers and combinations thereof) is of particular interest. Processes for the manufacture of trans-1,3,3,3-tetrafluoropropene are disclosed in U.S. Pat. Nos. 7,230,146 and 7,189,884. Processes for the manufacture of trans-l-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agents and non-reactive surfactants, comprise the first component, commonly referred to as the "A" component. A polyol or mixture of polyols, one or more surfactant, one or more catalyst, one or more blowing agent, and other optional components including but not limited to flame retardants, colorants, compatibilizers, and solubilizers typically comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

Applicants have come to appreciate that a shortcoming of two-component systems, especially those using certain hydrohaloolefins, including 1234ze(E), 1336(Z), and 1233zd(E), is the shelf-life of the B-side composition. Normally when a foam is produced by bringing together the A and B side components, a good foam is obtained. However, applicants have found that if the polyol premix composition containing certain halogenated olefin blowing agents, including in particular 1234ze(E) and 1233zd(E), and a typical amine-containing catalyst is aged, prior to treatment with the polyisocyanate, deleterious effects can occur. For example, applicants have found that such formulations can produce a foamable composition which has an undesirable increase in reactivity time and/or a subsequent cell coalescence. The resulting foams are of lower quality and/or may even collapse during the formation of the foam.

Applicant's recognition of the potential reaction between certain hydrohaloolefins, including 1234ze(E), 1336(Z), and 1233zd(E), and tertiary amine catalysts has resulted in a recognition that limitations can exist with the use of generally used strong front-end amine catalyst for spray polyurethane foam with certain hydrohaloolefins as the blowing agent. On the other hand, without strong front-end catalyst (s), the sprayed mixture of isocyanate and polyol resin, especially in the case of to a vertical wall or underneath roof/floor, can tend to drip/drain, and the polyurethane foam could pull away from the substrate. Other properties such as yield R-value, and related properties could be negatively affected. Applicants have discovered that a dramatic improvement in foam formation and/or performance can be achieved by using certain amine catalysts that are more stable than others, or decreasing the amount of the more generally used amine-based catalyst in the system, to the point in certain embodiments of substantially eliminating the amine-based catalyst, and using instead certain metal-based catalysts or blends of metal catalyst(s) and amine catalyst(s). While the use of such metal-based catalyst has been found to be especially advantageous in many formulations and applications, applicants have come to appreciate that a difficulty/disadvantage may be present in certain foam premix formulations. Furthermore, applicants have found that foam premix formulations having relatively high concentrations of water, as defined hereinafter, tend to not achieve acceptable results in storage stability, in the final foam and/or in the foam processing when certain metal catalysts are utilized. Applicants have found that this unexpected problem can be overcome by careful selection of the metal-based catalyst(s), including complexes and/or blends of metal catalyst(s) and amine catalyst(s) to produce highly advantageous and unexpected results, as described further hereinafter.

SUMMARY

Applicants have found that in certain embodiments a substantial advantage can be achieved in foams, foamable compositions, foam premixes, and associated methods and systems, by the selection of a catalyst system which includes a bismuth-based catalyst. Applicants have surprisingly, and unexpectedly, found that effective amounts of such catalysts result in faster or improved front-end catalytic reactivity, as compared to formulations lacking such a catalyst. In certain aspects of the invention, such reactivity is measured as decreased cream time of the formulation. To this end, and in certain aspects, the improved cream time demonstrated herein is equated with a faster front-end activity of the compositions herein.

Thus, according to one aspect of the invention, applicants have found that blowing agents, foamable compositions, pre-mixes and foams which utilize the bismuth-based catalysts provided herein, either alone or in combination with an amine catalyst and/or additional non-amine catalysts, can improve the foam formation time and/or also extend the shelf life of polyol premixes containing hydrohaloolefins and can improve the quality of the foams produced therefrom. This advantage is believed to be present with hydrohaloolefins generally, C3 and C4 hydrohaloolefins more preferably, and even more preferably but not limited to 1234ze(E), and/or 1233zd(E), and/or 1336mzzm(Z), and even more preferably with 1233zd(E). Applicants have found that good quality foams can be produced according to the present invention even if the polyol blend has been aged several weeks or months.

To this end, and in certain preferred aspects, the present invention relates to foamable compositions and foam premixes including a hydrohaloolefin blowing agent, one or more polyols, one or more surfactants, and a catalyst system comprising a bismuth-based catalyst. Such catalysts system may also include additional amine or non-amine catalysts. In certain aspects, it includes at least one aromatic amine.

According to further aspects, this invention relates to rigid to semi-rigid, polyurethane and polyisocyanurate foams and methods for their preparation, which are characterized by a fine uniform cell structure and little or no foam collapse. The foams are preferably produced with an organic polyisocyanate and a polyol premix composition which comprises a combination of a blowing agent, which is preferably a hydrohaloolefin, a polyol, a silicone surfactant, and a catalyst system which one or more of the bismuth-based catalysts are included. Such catalyst systems may also include one or more additional amine catalysts and/or additional non-amine catalysts, which may be provided in a minor proportion based on all the catalysts in the system. In certain aspects, the catalyst system includes at least one aromatic amine.

Additional aspects, embodiments, and advantages of the invention will be readily apparent to one of skill in the art on the basis of the disclosure provided herein.

DETAILED DESCRIPTION OF PREFERRED EMBODIMENTS

Figure 1:
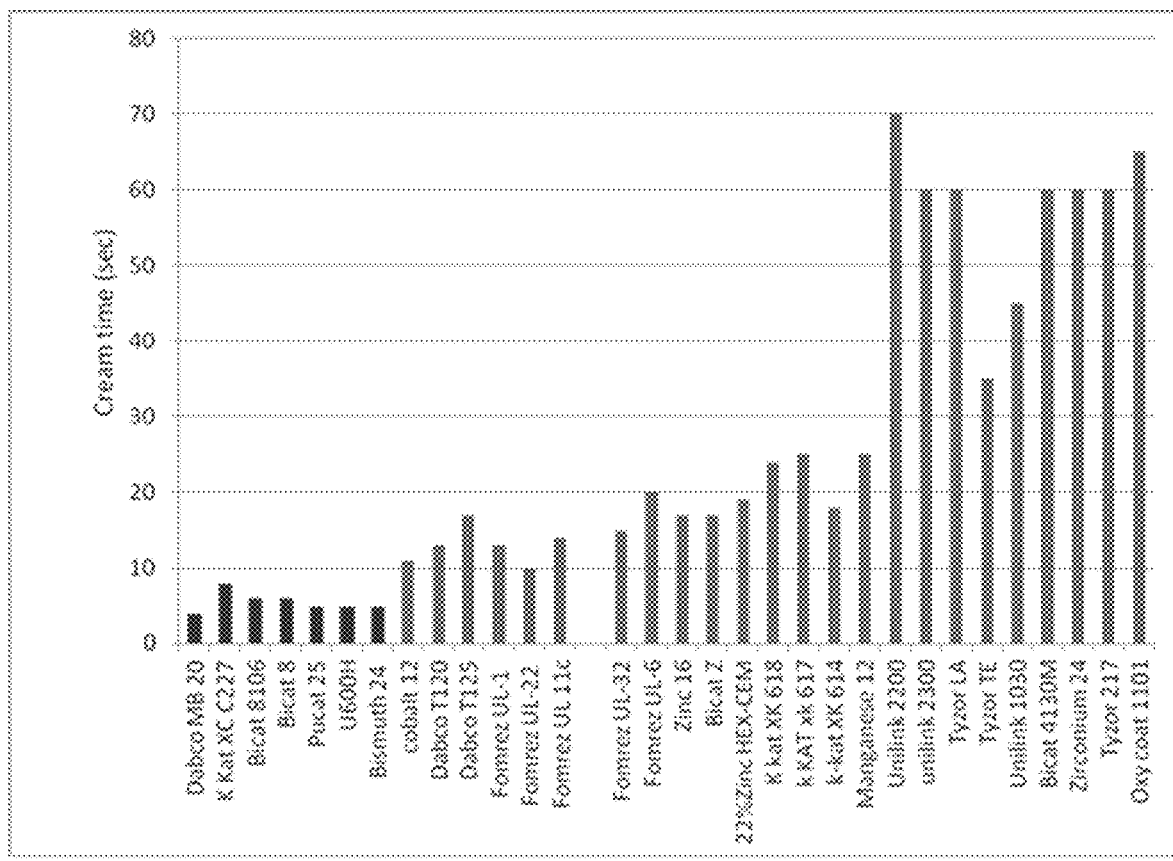
FIG. 1 illustrates comparative cream times of various metal catalysts tested.

The present invention, in certain aspects, provides polyol premix compositions which comprise a combination of a blowing agent, one or more polyols, one or more silicone surfactants, and a catalyst system including a bismuth-based catalyst. Applicants have surprisingly, and unexpectedly, found that such catalysts, when present in effective amounts, cause the composition to exhibit faster front-end catalytic reactivity. Such reactivity is also surprisingly and unexpectedly maintained as the premix is aged. To this end, the compositions of the present invention provide a storage stable premix that is exhibits improved front-end reactivity.

In accordance with the foregoing, and in certain aspects, the present invention provides polyol premix compositions which comprise a combination of a blowing agent, one or more polyols, one or more silicone surfactants, and a catalyst system. The blowing agent comprises one or more hydrohaloolefins, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, water or combinations thereof. The catalyst system includes a bismuth-based catalyst system. Such catalysts may be used alone or in combination with other metal and/or amine catalysts. In certain aspects, the catalyst system also includes at least one aromatic amine catalyst. The invention also provides a method of preparing a polyurethane or polyisocyanurate foam comprising reacting an organic polyisocyanate with the polyol premix composition.

The Hydrohaloolefin Blowing Agent

The blowing agent component comprises a hydrohaloolefin, preferably comprising at least one or a combination of 1234ze(E), 1233zd(E), and isomer blends thereof, and/or 1336mzzm(Z), and optionally a hydrocarbon, fluorocarbon, chlorocarbon, fluorochlorocarbon, halogenated hydrocarbon, ether, fluorinated ether, ester, alcohol, aldehyde, ketone, organic acid, gas generating material, water or combinations thereof.

The hydrohaloolefin preferably comprises at least one haloalkene such as a fluoroalkene or chlorofluoroalkene containing from 3 to 4 carbon atoms and at least one carbon-carbon double bond. Preferred hydrohaloolefins non-exclusively include trifluoropropenes, tetrafluoropropenes such as (1234), pentafluoropropenes such as (1225), chlorotrifloropropenes such as (1233), chlorodifluoropropenes, chlorotrifluoropropenes, chlorotetrafluoropropenes, hexafluorobutenes (1336) and combinations of these. More preferred for the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (1234ze); 1,1,3,3-tetrafluoropropene; 1,2,3,3,3-pentafluoropropene (1225ye), 1,1,1-trifluoropropene; 1,2,3,3,3-pentafluoropropene, 1,1,1,3,3-pentafluoropropene (1225zc) and 1,1,2,3,3-pentafluoropropene (1225yc); (Z)-1,1,1,2,3-pentafluoropropene (1225yez); 1-chloro-3,3,3-trifluoropropene (1233zd), 1,1,1,4,4,4-hexafluorobut-2-ene (1336mzzm) or combinations thereof, and any and all stereoisomers of each of these.

Preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Co-Blowing Agents

Preferred optional co-blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (124); 1,1-dichloro-1-fluoroethane (141b); 1,1,1,2-tetrafluoroethane (134a); 1,1,2,2-tetrafluoroethane (134); 1-chloro 1,1-difluoroethane (142b); 1,1,1,3,3-pentafluorobutane (365mfc); 1,1,1,2,3,3,3-heptafluoropropane (227ea); trichlorofluoromethane (11); dichlorodifluoromethane (12); dichlorofluoromethane (22); 1,1,1,3,3,3-hexafluoropropane (236fa); 1,1,1,2,3,3-hexafluoropropane (236ea); 1,1,1,2,3,3,3-heptafluoropropane (227ea), difluoromethane (32); 1,1-difluoroethane (152a); 1,1,1,3,3-pentafluoropropane (245fa); butane; isobutane; normal pentane; isopentane; cyclopentane, or combinations thereof. In certain embodiments the co-blowing agent(s) include one or a combination of water and/or normal pentane, isopentane or cyclopentane, which may be provided with one or a combination of the hydrohaloolefin blowing agents discussed herein. The blowing agent component is preferably present in the polyol premix composition in an amount of from about 1 wt. % to about 30 wt. %, preferably from about 3 wt. % to about 30 wt. %, and more preferably from about 5 wt. % to about 25 wt. %, by weight of the polyol premix composition. When both a hydrohaloolefin and an optional blowing agent are present, the hydrohaloolefin component is preferably present in the blowing agent component in an amount of from about 5 wt. % to about 99 wt. %, preferably from about 7 wt. % to about 98 wt. %, and more preferably from about 10 wt. % to about 95 wt. %, by weight of the blowing agent components; and the optional blowing agent is preferably present in the blowing agent component in an amount of from about 95 wt. % to about 1 wt. %, preferably from about 93 wt. % to about 20 wt. %, and more preferably from about 90 wt. % to about 30 wt. %, by weight of the blowing agent components.

Polyol Component

The polyol component, which includes mixtures of polyols, can be any polyol or polyol mixture which reacts in a known fashion with an isocyanate in preparing a polyurethane or polyisocyanurate foam. Useful polyols comprise one or more of a sucrose containing polyol; Mannich polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b), wherein (a) is selected from glycerine, ethylene glycol, diethylene glycol, trimethylolpropane, ethylene diamine, pentaerythritol, soy oil, lecithin, tall oil, palm oil, and castor oil; and (b) is selected from ethylene oxide, propylene oxide, a mixture of ethylene oxide and propylene oxide; and combinations thereof. The polyol component is usually present in the polyol premix composition in an amount of from about 60 wt. % to about 95 wt. %, preferably from about 65 wt. % to about 95 wt. %, and more preferably from about 65 wt. % to about 80 wt. %, by weight of the polyol premix composition.

Surfactant

The polyol premix composition preferably also contains a silicone surfactant. The silicone surfactant is preferably used to emulsify the polyol preblend mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, DC-5357 and DC-5598; and B-8404, B-8407, B-8409 and B-8462 from Evonik Industries AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. The preferred non-silicone non-ionic surfactants are Dabco LK-221 or LK-443 which is commercially available from Air Products Corporation, and VORASURF™ 504 from DOW. When a non-silicone, non-ionic surfactant used, it is usually present in the polyol premix composition in an amount of from about 0.25 wt. % to about 3.0 wt. %, preferably from about 0.5 wt. % to about 2.5 wt. %, more preferably from about 0.75 wt. % to about 2.5 wt. %, and even more preferably from about 0.75 wt. % to about 2.0 wt. %, by weight of the polyol premix composition.

The Catalyst System

In certain preferred aspects of the present invention, the catalyst systems include at least one bismuth-based catalyst. Applicants have surprisingly, and unexpectedly, found that effective amounts of such catalysts result in faster or improved front-end catalytic reactivity, as compared to formulations lacking such a catalyst. As noted herein, the front-end catalytic activity, while not limited thereto, is measured by improved or decreased cream time. As used herein, the "effective amount" of the catalysts may include any amount wherein an improvement of cream time is measurable or detectable, as compared to formulations lacking the catalysts. In certain aspects, such catalysts are provided in an amount sufficient to provide a composition exhibiting a cream time of about or less than 10 seconds, in certain preferred aspects of about or less than 8 seconds, in further preferred aspects of about or less than 6 seconds, and in certain preferred aspects of about or less than 5 seconds. In further aspects, such catalysts are provided in an amount sufficient to provide an improved front-end reactivity or cream time of at least 10%, of at least 20%, of at least 30%, relative to compositions lacking the catalysts of the present invention or having a non-bismuth based metal catalyst or any other metal catalyst.

As used herein, the term "cream time" means a measure of the beginning of the foam reaction between isocyanates and polyols. It is usually characterized by a change in the liquids color as it begins to rise. That is, it is measured from the mixing of all foam forming components until the mixture begins to change color.

Applicants further demonstrate herein that the faster cream time is maintained as the premixed is aged. To this end, the compositions of the present invention provide a storage stable premix that is exhibits improved front-end reactivity.

As used herein the term "bismuth-based catalyst" or "bismuth-based metal catalyst," particularly those that exhibit improved front-end reactivity or cream time, refers to salts, complexes or compositions of the metal bismuth with any organic group. In certain aspects, it may be represented by the formula Bi—$(R)_3$, wherein each R may be independently selected from the group consisting of comprises a hydrogen, a halide, a hydroxide, a sulfate, a carbonate, a cyanate, a thiocyanate, an isocyanate, a isothiocyanate, a carboxylate, an oxalate, or a nitrate. In further embodiments, each R may independently include a substituted or unsubstituted alkyl, heteroalkyl, aryl, or heteroaryl group, including, but not limited to, substituted or unsubstituted alkanes, substituted or unsubstituted alkenes, substituted or unsubstituted alkynes, ketones, aldehydes, esters, ethers, alcohols, alcoholates, phenolates, glycolates, thiolates, carbonates, carboxylates, octoates, hexanoates, amides, amines, imides, imines, sulfides, sulfoxides, phosphates, or combinations thereof, where in certain embodiments, where applicable, such moieties contain between 1-20 carbon atoms, or between 1-10 carbon atoms, and may be optionally substituted at one or more positions. In certain preferred embodiments, Bi—$(R)_3$ may form one or a derivative of a bismuth carboxylate, a bismuth octoate, bismuth hexanoate, bismuth 2-ethylhexanoate, a bismuth acetylacetonate, bismuth ethoxide, bismuth propoxide, bismuth butoxide, bismuth isopropoxide, or bismuth butoxide. Further non-limiting examples of organic bismuth-based catalysts of the present invention, particularly those exhibiting improved front-end reactivity or cream time, include, but are not limited to, those identified by the tradenames Dabco MB20 by Air Products, K-Kat XC C227 by King Industries, Bicat 8210, Bicat 8106, Bicat 8 by Shepherd, Pucat 25 by Nihon Kagaku Sangyo, U600H by Nitto Kasei, and Tromax Bismuth 24 by Troy Chemical.

Any bismuth-based catalysts of the present invention may be present in the polyol premix composition in an amount of from about 0.001 wt. % to about 5.0 wt. %, 0.01 wt. % to about 4.0 wt. %, preferably from about 0.1 wt. % to about 3.5 wt. %, and more preferably from about 0.2 wt. % to about 3.5 wt. %, by weight of the polyol premix composition. While these are usual amounts, the quantity of the foregoing catalyst can vary widely, and the appropriate amount can be easily be determined by those skilled in the art. Such amounts may be the amounts provided by each individual catalyst provided to the mixture, but in certain preferred aspects total weight of the bismuth-based metal catalysts of the present invention are within these ranges.

In further aspects, the catalyst system may include an additional non-amine catalyst and/or amine catalysts. The amine catalysts may include any one or more compounds containing an amino group and exhibiting the catalytic activity provided herein. Such compounds may be liner or branched or cyclic non-aromatic or aromatic in nature. Useful, non-limiting, amines include primary amines, secondary amines or tertiary amines, such as those provided above. Useful tertiary amine catalysts non-exclusively include N,N,N',N'',N''-pentamethyldiethyltriamine, N,N-dicyclohexylmethylamine; N,N-ethyldiisopropylamine; N-methyldicyclohexylamine (Polycat 12); N,N-dimethylcyclohexylamine (Polycat 8); benzyldimethylamine (BDMA); N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-(α-phenylethyl)amine, N,N,N-tri-n-propylamine, N,N,N',N',N'',N''-pentamethyldiethylenetriamine, N,N,N',N',N'',N''-pentaethyldiethylenetriamine, N,N,N',N',N'',N''-pentamethyldipropylenetriamine, tris-2,4,6-(dimethylaminomethyl)-phenol (DABCO® TMR-30), or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines include morpholines, imidazoles, ether containing compounds, and the like. These include: dimorpholinodiethylether, N-ethylmorpholine, N-methylmorpholine, bis(dimethylaminoethyl) ether, imidizole, 1,2 Dimethylimidazole (Toyocat DM 70 and DABCO® 2040), n-methylimidazole, 1,2-dimethylimidazole, dimorpholinodimethylether, 2,2-dimorpholinodiethylether (DMDEE), bis(diethylaminoethyl) ether, bis(dimethylaminopropyl) ether.

In embodiments where an amine catalyst is provided, the catalyst may be provided in any amount to achieve the function of the instant invention without affecting the foam forming or storage stability of the composition, as characterized herein. To this end, the amine catalyst may be provided in amounts less than or greater than the non-amine catalyst.

In certain aspects, of the invention Applicants have surprisingly and unexpectedly found that the inclusion of certain aromatic primary amine compounds further improves front-end reactivity, when used in combination of the bismuth-based catalyst. Such amines may include any compound of the formula $[R_mC_6H_n—NH_2]_x$, where m=0, 1, 2, 3, 4, or 5; n=0, 1, 2, 3, 4, or 5; and x=1 or 2, y=1, or 2, wherein m+n+x=6. In certain non-limiting aspects, each R may be independently selected from the group consisting of comprises a hydrogen, a halide, a hydroxide, a sulfate, a carbonate, a cyanate, a thiocyanate, an isocyanate, a isothiocyanate, a carboxylate, an oxalate, or a nitrate. In further embodiments, each R may independently include a substituted or unsubstituted alkyl, heteroalkyl, aryl, or heteroaryl group, including, but not limited to, substituted or unsubstituted alkanes, substituted or unsubstituted alkenes, substituted or unsubstituted alkynes, ketones, aldehydes, esters, ethers, alcohols, alcoholates, phenolates, glycolates, thiolates, carbonates, carboxylates, octoates, hexanoates, amides, amines, imides, imines, sulfides, sulfoxides, phosphates, or combinations thereof, where in certain embodiments, where applicable, such moieties contain between 1-20 carbon atoms, or between 1-10 carbon atoms, and may be optionally substituted at one or more positions.

In certain aspects, at least one R forms an aryl or heteroaryl aromatic ring structure, such as, but not limited to a benzene ring, or derivative thereof, which may be optionally substituted with one or a combination of any of the foregoing substituent groups defined by R above. In certain aspects, R includes one or more of a benzene, aniline, toluene, phenyl, benzidine, benzophenone, imidazole, aminoimidazole, pyridine, or combinations thereof, each of which may be optionally substituted with one or a combination of the foregoing substitutent groups defined by R above.

To this end, non-limiting aromatic amines of the present invention include aniline, fluoroaniline, chloroaniline, bromoaniline, nitroaniline, aminotoluene, fluoroaminotoluene, chloroaminotoluene, bromoaminotoluene, nitroaminotoluene, diaminobenzene, fluorodiaminobenzene, chlorodiaminobenzene, bromodiaminobenzene, nitrodiaminobenzene, diaminotoluene, 3,5-diethyltoluene-2,4-diamine, 3,5-diethyltoluene-2,6-diamine, dimethylthiotoluenediamine, benzidine, (di)fluorobenzidine, (di)chlorobenzidine, (di)bromobenzidien, (di)nitrobenzidine, (di)methylbenzidine, (di)ethylbenzidine, diaminodiphenylmethane, (di)fluorodiaminodiphenylmethane, (di)chlorodiaminodiphenylmethane, (di)bromodiaminodiphenylmethane, (di)methyldiaminodiphenylmethane, (di)ethyldiaminodiphenylmethane, diaminobenzophenone, (di)fluorodiaminobenzophenone, (di)chlorodiaminobenzophenone, (di)bromodiaminobenzophenone, (di)methyldiaminobenzophenone, (di)ethyldiaminobenzophenone, aminoimidazole, aminopyridine, bipyridinamine or combinations thereof. Such aromatic amines may also include those under the tradenames ETHACURE® 100 and ETHACURE® 300.

In alternative non-limiting embodiments of the foregoing, the aromatic amines may include a heteroaryl aromatic amine of the formula $R'—NH_2$ or $[R'—NH_2]_x$, wherein x=0, 1 or 2. R' comprises a heteroaryl ring moiety having at least one of N, O, or S, and from 2-20 carbon atoms, in certain aspects from 2-10 carbon atoms, and in further aspects from 2-6 carbon atoms. In further aspects, R' may include an aminoimidazole or aminopyridine. The R' heteroaryl ring may be optionally substituted at one or more positions around the ring by a substituent group, such as those defined by R above.

In addition to (or in certain embodiments in place of) an amine catalyst, the catalyst system of the present invention may also includes at least one non-amine catalyst. In certain embodiments, the non-amine catalysts are inorgano- or organo-metallic compounds. Useful inorgano- or organo-metallic compounds include, but are not limited to, organic salts, Lewis acid halides, or the like, of any metal, including, but not limited to, transition metals, post-transition metals, rare earth metals (e.g. lanthanides), metalloids, alkali metals, alkaline earth metals, or the like. According to certain broad aspects of the present invention, the metals may include, but are not limited to, bismuth, lead, tin, zinc, chromium, cobalt, copper, iron, manganese, magnesium, potassium, sodium, titanium, mercury, antimony, uranium, cadmium, thorium, aluminum, nickel, cerium, molybdenum, vanadium, zirconium, or combinations thereof. Non-exclusive examples of such inorgano- or organo-metallic catalysts include, but are not limited to, bismuth 2-ethylhexanote, bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, sodium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate, tin (II) 2-ethylhexanoate, dibutyltin dilaurate, or combinations thereof. In certain preferred embodiments the catalysts are present in the polyol premix composition in an amount of from about 0.001 wt. % to about 5.0 wt. %, 0.01 wt. % to about 4.0 wt. %, preferably from about 0.1 wt. % to about 3.5 wt. %, and more preferably from about 0.2 wt. % to about 3.5 wt. %, by weight of the polyol premix composition. While these are usual amounts, the quantity amount of the foregoing catalyst can vary widely, and the appropriate amount can be easily be determined by those skilled in the art.

In another embodiment of the invention, the non-amine catalyst is a quaternary ammonium carboxylate. Useful quaternary ammonium carboxylates include, but are not limited to: (2-hydroxypropyl)trimethylammonium 2-ethylhexanoate (TMR® sold by Air Products and Chemicals) and (2-hydroxypropyl)trimethylammonium formate (TMR-2® sold by Air Products and Chemicals). These quaternary ammonium carboxylate catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of catalyst can vary widely, and the appropriate amount can be easily be determined by those skilled in the art.

In general, applicants have found that metal catalysts are nonreactive with halogenated olefins that are adaptable for use as blowing agents and therefore appear to produce a relatively stable system, and that with a judicious selection of a metal catalyst surprisingly effective and stable compositions, systems and methods can be obtained.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868, 224; 3,401,190; 3,454,606; 3,277,138; 3,492,330; 3,001, 973; 3,394,164; 3,124.605; and 3,201,372. Preferred as a class are the aromatic polyisocyanates.

Representative organic polyisocyanates correspond to the formula:

$$R(NCO)z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5, 5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4, 4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are sodium acetate, potassium octoate, and sodium N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, N-Methylol dimethylphosphonopropionamide, aminophenyl phosphate, mixed esters with diethylene glycol and propylene glycol of 3,4,5,6-tetrabromo-1,2-benzenedicarboxylic acid, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

EXAMPLES

The following non-limiting examples serve to illustrate the invention.

Example 1

To evaluate the front-end reactivity of metal catalysts, a resin with a formulation in Table 1 was prepared. Various metal catalysts, including bismuth, cobalt, tin, zinc, manganese, titanium, zirconium, iron, were tested in the polyol preblend. The polyol blend (50° F.) was then reacted with equal amount of isocyanate Lupranate M20 at 70° F. The cream time was recorded and was based on the interval of time between mixing together the polyol and diisocyante and the change in the color of the liquid as the mixture begins to rise.

TABLE 1

| Component | Phpp |
|---|---|
| Terate 4020 | 60 |
| Voranol 470X | 30 |
| Voranol 360 | 10 |
| Antiblaze AB 80 | 10 |
| PHT-4-Diol | 3 |
| Water | 2.5 |
| Dabco DC 193 | 1.5 |
| 1233zd (E) | 12 |
| Metal catalyst | 3 |

As evident from FIG. 1, the first seven catalysts tested (all bismuth-based catalysts) all have cream times below those of the other metal catalysts tested. Only bismuth catalysts showed a cream time of around 5 seconds. All other metal catalysts produced a reaction with a cream time longer than 10 seconds. This results showed that only bismuth catalysts have the potential being used as the front-end catalysts.

Example 2

Bismuth catalysts also display good stability in well-designed resin system. The following experiments which used Toyocat DM70 as the gelling catalysts which is not a front-end catalyst, and Dabco K15 as the trimer catalyst which is good for back-end cure, along with the bismuth catalysts (Table 2).

The initial reactivity of such resin system was measured by reacting the freshly prepared resin at 50° F. with equal amount of isocyanate Lupranate M20 at 70° F. The aged reactivity was measured similarly, e.g. by reacting the resin (50° F.) which has been aged at room temperature for a predetermined time, with Lupranate M20 at 70° F.

TABLE 2

| Component | Phpp |
|---|---|
| Terate 4020 | 60 |
| Voranol 470X | 30 |
| Voranol 360 | 10 |
| Antiblaze AB 80 | 10 |
| PHT-4-Diol | 3 |
| Water | 2.2 |
| Dabco DC 193 | 1.5 |
| Toyocat DM 70 | 3 |
| K 15 | 1 |
| Bismuth catalyst | 0.5 |
| 1233zd (E) | 12 |

Figure 2:
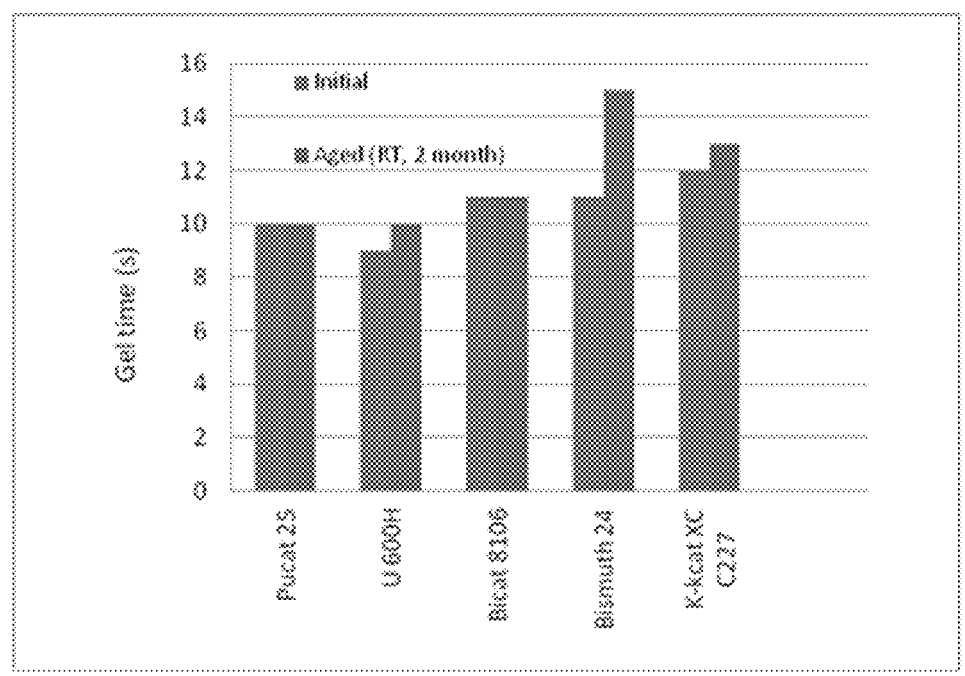
FIG. 2 illustrates a comparative of foam premix stability with various bismuth based catalysts.

As illustrated in FIG. 2, the results showed bismuth catalysts such as Pucat 25, U600H, Bicat 8106, K-KAT XC C227 has shown excellent stability in the catalyst package used the resin system which maintained the reactivity after aging. One bismuth catalyst, Troymax Bismuth 24, however deteriorated during the aging with a decreased reactivity.

Example 3

Example 2 is repeated using Dabco MB20, Bicat 8, and Bicat 8210. The initial reactivity of such resin system is measured by reacting the freshly prepared resin at 50° F. with equal amount of isocyanate Lupranate M20 at 70° F. The aged reactivity is measured similarly, by reacting the resin (50° F.) which is aged at room temperature for a predetermined time, with Lupranate M20 at 70° F.

The results show that the bismuth catalysts Dabco MB20, Bicat 8, and Bicat 8210 exhibit stability in the catalyst package that is within commercially tolerable levels and also that reactivity is maintained after aging.

Example 4

Applicants also discovered that the front-end reactivity can be further improved by using an additive, Ethacure 100, without affecting the stability of the system, even though this additive is a primary amine. That is, in the following experiments Toyocat DM70 was used as the gelling catalyst, which is not a front-end catalyst, and Dabco K15 as the trimer catalyst which is good for back-end cure. These were provided with the additive Ethacure 100, a primary aromatic amine, and the bismuth catalyst Pucat 25. (Table 3).

As illustrated below, the cream time was 5 seconds when the resin containing a catalyst package of Toyocat DM 70, Dabco K15 and Pucat 25, reacted with equal amount of isocyanate Lupranate M20 at 70° F. The cream time decreased when Ethacure 100 was used in the resin system. Meanwhile the resin system maintained its reactivity after aging. Meanwhile, when the tin catalyst Dabco 120 was used instead of the strong front-end bismuth catalyst, the cream time is much longer, as shown in formulation D and E. Thus, the bismuth-based catalysts exhibited stability and faster cream time when used with the aromatic amine.

TABLE 3

| Component | | A | B | C | D | E |
|---|---|---|---|---|---|---|
| Terate 4020 | | 60 | 60 | 60 | 60 | 60 |
| Voranol 470X | | 30 | 30 | 30 | 30 | 30 |
| Voranol 360 | | 10 | 10 | 10 | 10 | 10 |
| Antiblaze AB 80 | | 10 | 10 | 10 | 10 | 10 |
| PHT-4-Diol | | 3 | 3 | 3 | 3 | 3 |
| Water | | 2.2 | 2.2 | 2.2 | 2.2 | 2.2 |
| Dabco DC 193 | | 1.5 | 1.5 | 1.5 | 1.5 | 1.5 |
| Toyocat DM 70 | | 3 | 3 | 3 | 3 | 3 |
| Dabco K 15 | | 1 | 1 | 1 | 1 | 1 |
| Pucat 25 | | 0.6 | 0.6 | 0.6 | | |
| Dabco T120 | | | | | 0.6 | 0.6 |
| Ethacure 100 | | | 2 | 3 | 2 | 3 |
| 1233zd (E) | | 12 | 12 | 12 | 12 | 12 |
| Initial reactivity | Cream | 5 sec | 4 sec | 4 sec | 9 sec | 8 sec |
| | Gel | 11 sec | 9 sec | 8 sec | 12 sec | 11 sec |
| Aged reactivity (RT, 3 month) | Cream | 5 sec | 5 sec | 5 sec | 10 sec | 9 sec |
| | Gel | 12 sec | 10 sec | 10 sec | 14 sec | 12 sec |

Example 5

Example 4 was repeated using each of the bismuth catalysts U 600H, Bicat 8106, K kcatXC C227, Dabco MB20, and Bicat 8. Consistent with the foregoing, the cream time is accelerated and within commercially tolerable levels, when reacted with equal amounts of isocyanate Lupranate M20 at 70° F. The cream time is also accelerated and the composition stable when Ethacure 100 is used in the resin system.

Example 6

Strong front-end reactivity can be achieved by using different amine catalysts, different metal catalysts (other than bismuth) along with the bismuth catalysts. That is, in the following experiments strong front-end bismuth catalyst Bicat 8210 was used along with trimer catalyst Dabco K15 and a gelling amine catalyst Toyocat DM 70 (lower dose compared with those in Example 4) were used. Zinc-based catalyst blend K-KAT XK 617, which is not a front-end metal catalyst, is also used. Short cream time can be obtained with such a catalyst package. This cream time can be further improved by addition the aromatic amine Ethacure 100 or a weak amine catalyst DMDEE.

| Component | | F | G | H | I | J |
|---|---|---|---|---|---|---|
| Terate 4020 | | 60 | 60 | 60 | 60 | 60 |
| Voranol 470X | | 30 | 30 | 30 | 30 | 30 |
| Voranol 360 | | 10 | 10 | 10 | 10 | 10 |
| Antiblaze AB 80 | | 10 | 10 | 10 | 10 | 10 |
| PHT-4-Diol | | 3 | 3 | 3 | 3 | 3 |
| Water | | 2.2 | 2.2 | 2.2 | 2.2 | 2.2 |
| Dabco DC 193 | | 1.5 | 1.5 | 1.5 | 1.5 | 1.5 |
| Dabco 2040 | | 1 | 1 | 1 | 2 | 2 |
| Dabco K 15 | | 1 | 1 | 1 | 1 | 1 |
| Bicat 8210 | | 1 | 1 | 1 | 1 | 0.7 |
| K KAT XK 617 | | 2 | 2 | 2 | 1 | 2 |
| DMDEE | | | 2 | | | |
| Ethacure 100 | | | | 2 | | |
| 1233zd (E) | | 12 | 12 | 12 | 12 | 12 |
| Initial reactivity | Cream Time | 5 sec | 4 sec | 4 sec | 4 sec | 5 sec |
| | Gel Time | 10 sec | 9 sec | 9 sec | 10 sec | 10 sec |

Example 7

Example 6 is repeated using the bismuth-based catalysts Dabco MB20, k Kat XC C227, Bicat 8106, Bicat 8, Pucat 25, and U600H. The strong front-end reactivity is similarly achieved using different amine catalysts and different metal catalysts (other than bismuth) along with the bismuth catalysts. That is, these bismuth catalysts are each used along with trimer catalyst Dabco K15 and a gelling amine catalyst Toyocat DM 70 (lower dose compared with those in Example 4) is used. Zinc-based catalyst blend K-KAT XK 617, which is not a front-end metal catalyst, is also used. Short cream time is obtained with such a catalyst package. This cream time is further improved by addition the aromatic amine Ethacure 100 or a weak amine catalyst DMDEE.

What is claimed is:
1. A method of forming a thermoset foam comprising:
  forming a polyol premix comprising: (a) from about 60 wt % to about 95 wt % of polyol; (b) from about 1 wt % to about 30 wt % of blowing agent, said blowing agent comprising from about 7 wt % to about 98 wt % of 1,1,1,4,4,4hexafluorobut-2-ene, wherein said 1,1,1,4,4,4hexafluorobut-2-ene consists essentially of 1,1,1,4,4,4hexafluorobut-2-ene (1336mzzm(Z)); (c) at least one surfactant; and (d) a catalyst system comprising metal-based catalyst, wherein said metal based-catalyst consists essentially of at least one bismuth-based metal catalyst;

storing said polyol premix for a period of at least one month;

forming a foamable composition by combining after said storing step said polyol premix with a reactive component, forming a foam from said foamable composition, provided that said polyol premix is sufficiently free of non-bismuth-based catalyst such that said foam has a cream time of not greater than 10 seconds.

2. The method of claim 1 wherein said foam formed from said polyol premix has a cream time of not greater than 10 seconds when aged for 3 months at room temperature.

3. The method of claim 1 wherein said bismuth-metal catalyst comprises a catalyst represented by the formula Bi—(R)$_3$, wherein each R is independently selected from the group consisting of a hydrogen, a halide, a hydroxide, a sulfate, a carbonate, a cyanate, a thiocyanate, an isocyanate, a isothiocyanate, a carboxylate, an oxalate, a C1-C10 alkane, a C1-C10 alkene, a C1-C10 alkyne, a heteroalkyl group, an aryl group, a ketone, an aldehyde, an esters, an ether, an alcohol, an alcoholate, a phenolate, a glycolates, a thiolates, an octoate, a hexanoate, and combinations thereof, where any of the foregoing R groups may be independently substituted or unsubstituted.

4. The method of claim 1 wherein said bismuth-metal catalyst is selected from the group consisting of a bismuth carboxylate, a bismuth octoate, bismuth hexanoate, bismuth 2-ethylhexanoate, a bismuth acetylacetonate, bismuth ethoxide, bismuth propoxide, bismuth butoxide, bismuth isopropoxide, bismuth butoxide, a derivative thereof, and combinations thereof.

5. The polyol premix of claim 1 wherein said bismuth-metal catalyst comprises a bismuth carboxylate or a derivative thereof.

6. The method of claim 1 wherein said bismuth-metal catalyst comprises bismuth 2-ethylhexanoate, or a derivative thereof.

7. The method of claim 1 wherein said at least one bismuth-based metal catalyst is present in the composition in an amount to provide foam formed from said aged polyol premix with a cream time of less than about 6 seconds after aging for 3 months at room temperature.

8. The method of claim 1 wherein said polyol premix further comprises an aromatic amine catalyst comprising a compound of the formula [R$_m$C6H$_n$—NH2]$_x$, where m=0, 1, 2, 3, 4, or 5, n=0, 1, 2, 3, 4, or 5, x=1, or 2, and m+n+x=6 and wherein each R may be independently selected from the group consisting of comprises a hydrogen, a halide, a hydroxide, a sulfate, a carbonate, a cyanate, a thiocyanate, an isocyanate, a isothiocyanate, a carboxylate, an oxalate, a nitrate, a substituted or unsubstituted alkyl, heteroalkyl group, a substituted or unsubstituted aryl group, a substituted or unsubstituted heteroaryl group, and combinations thereof.

9. The method of claim 8 wherein at least one R is selected from the group consisting of aniline, fluoroaniline, chloroaniline, bromoaniline, nitroaniline, aminotoluene, fluoroaminotoluene, chloroaminotoluene, bromoaminotoluene, nitroaminotoluene, diaminobenzene, fluorodiaminobenzene, chlorodiaminobenzene, bromodiaminobenzene, nitrodiaminobenzene, diaminotoluene, 3,5-diethyltoluene-2,4-diamine, 3,5-diethyltoluene-2,6-diamine, dimethylthiotoluenediamine, benzidine, (di)fluorobenzidine, (di)chlorobenzidine, (di)bromobenzidien, (di)nitrobenzidine, (di)methylbenzidine, (di)ethylbenzidine, diaminodiphenylmethane, (di)fluorodiaminodiphenylmethane, (di)chlorodiaminodiphenylmethane, (di)bromodiaminodiphenylmethane, (di)methyldiaminodiphenylmethane, (di)ethyldiaminodiphenylmethane, diaminobenzophenone, (di)fluorodiaminobenzophenone, (di)chlorodiaminobenzophenone, (di)bromodiaminobenzophenone, (di)methyldiaminobenzophenone, (di)ethyldiaminobenzophenone, aminoimidazole, aminopyridine, bipyridinamine and combinations thereof.

10. The method of claim of claim 8 wherein the aromatic amine catalyst comprises a compound of the formula [R'—NH$_2$]$_x$, wherein x=0, 1 or 2 and R' comprises a heteroaryl ring moiety having at least one of N, O, or S, and from 2-20 carbon atoms and may be optionally substituted.

11. The method of claim 1 wherein said polyol premix further comprises a co-blowing agent selected from the group consisting of water, hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

12. The method of claim 1 wherein said step of forming a foamable composition comprises combining an isocyanate component with said aged polyol premix composition, wherein said aged polyol premix composition comprises: (a) from about 60 wt % to about 95 wt % of polyol; (b) from about 1 wt % to about 30 wt % of blowing agent, said blowing agent comprising from about 7 wt % to about 98 wt % 1,1,1,4,4,4hexafluorobut-2-ene (1336mzzm(Z)); (c) at least one surfactant; and (d) a catalyst system comprising metal-based catalyst, wherein said metal based-catalyst consists essentially of at least one bismuth-based metal catalyst and being sufficiently free of non-bismuth-based catalyst to provide said foamable composition with an initial cream time of less than about 10 seconds and wherein said foamable composition combined with said aged polyol premix has a cream time of not greater than 10 seconds after aging for 3 months at room temperature, said weight percentages of each of (a) through (b) being based on the total of components (a)-(d) in the polyol premix.

13. The method of claim 12 wherein said at least one bismuth-based metal catalyst is present in the aged polyol premix in an amount to provide foam formed from said foamable composition with a cream time of less than about 6 seconds after aging for 3 months at room temperature.

14. The method of claim 13 wherein said polyol premix comprises (a) from about 65 wt % to about 95 wt % of at least one polyol; (b) from about 3 wt % to about 30 wt % of blowing agent, said blowing agent comprising from about 10% to about 95% of 1,1,1,4,4,4hexafluorobut-2-ene (1336mzzm(Z)).

15. A foam formed from the method of claim 1.

16. A method of forming a thermoset foam comprising:
forming a polyol premix comprising a combination of: (i) an isocyanate component and (ii) an aged polyol premix composition comprising: (a) from about 60 wt % to about 95 wt % of at least one polyol; (b) from about 1 wt % to about 30 wt % of blowing agent, said blowing agent comprising from about 7 wt % to about 98 wt % of 1,1,4,4,4-hexafluorobut-2-ene, wherein said 1,1,4,4,4-hexafluorobut-2-ene consists essentially of 1,1,4,4,4-hexafluorobut-2-ene (1336mzzm(Z)); (c) at least one surfactant; and (d) a catalyst system comprising metal-based catalyst, wherein said metal based-catalyst consists essentially of at least one bismuth-based metal catalyst and being sufficiently free of non-bismuth-based catalyst to provide said foamable composition with at least about 10% front-end reactivity improvement relative to the same foamable composition in the absence of said bismuth-based metal catalyst.

17. The method of claim 16 wherein said at least one bismuth-metal catalyst comprises a catalyst represented by the formula Bi—(R)3, wherein each R is independently selected from the group consisting of a hydrogen, a halide, a hydroxide, a sulfate, a carbonate, a cyanate, a thiocyanate, an isocyanate, a isothiocyanate, a carboxylate, an oxalate, a nitrate, a Cl-C10 alkane, a C1-C10 alkene, a C1-C10 alkyne, a heteroalkyl group, an aryl group, a ketone, an aldehyde, an esters, an ether, an alcohol, an alcoholate, a phenolate, a glycolates, a thiolates, an octoate, a hexanoate, and combinations thereof, where any of the foregoing R groups may be independently substituted or unsubstituted.

18. The method of claim 17 wherein said at least one bismuth-metal catalyst is selected from the group consisting of a bismuth carboxylate, a bismuth octoate, bismuth hexanoate, bismuth 2-ethylhexanoate, a bismuth acetylacetonate, bismuth ethoxide, bismuth propoxide, bismuth butoxide, bismuth isopropoxide, bismuth butoxide, a derivative thereof, and combinations thereof.

19. The method of claim 18 wherein the amount of said at least one bismuth-based metal catalyst is effective to provide said foamable composition with at least about 20% front-end reactivity improvement relative to the same foamable composition in the absence of said bismuth-based metal catalyst.

20. A method of forming a thermoset foam comprising:
forming a polyol premix comprising: (a) from about 60 wt % to about 95 wt % of polyol; (b) from about 1 wt % to about 30 wt % of blowing agent, said blowing agent comprising from about 7 wt % to about 98 wt % of 1,1,4,4,4-hexafluorobut-2-ene, wherein said 1,1,4,4,4-hexafluorobut-2-ene consists essentially of 1,1,1,4,4,4hexafluorobut-2-ene (1336mzzm(Z)); (c) at least one surfactant; and (d) a catalyst system comprising metal-based catalyst, wherein said metal based-catalyst consists essentially of at least one bismuth-based metal catalyst;
using said polyol premix after a storage period of at least one month to form a foamable composition by combining said polyol premix with a reactive component,
forming a foam by spraying said foamable composition, where said sprayed foam has a cream time of not greater than 10 seconds.

* * * * *